United States Patent [19]

Sato

[11] Patent Number: 5,689,392
[45] Date of Patent: Nov. 18, 1997

[54] TAPE CASSETTE

[75] Inventor: Shinya Sato, Miyagi, Japan

[73] Assignee: Sony Corporation, Tokyo, Japan

[21] Appl. No.: 715,779

[22] Filed: Jun. 14, 1991

[30] Foreign Application Priority Data

Jun. 15, 1990 [JP] Japan .................... 2-155278

[51] Int. Cl.$^6$ .................................... G11B 23/02
[52] U.S. Cl. .................................. 360/132; 242/346
[58] Field of Search .................. 360/130.21, 130.33, 360/132; 425/556; 524/508; 242/194, 199

[56] References Cited

U.S. PATENT DOCUMENTS

| | | | |
|---|---|---|---|
| 3,955,778 | 5/1976 | Lu ............................................. | 242/194 |
| 4,274,118 | 6/1981 | Mangold ............................ | 360/130.24 |
| 4,683,510 | 7/1987 | Meguro ................................... | 360/132 |
| 4,697,702 | 10/1987 | Urayama ................................ | 360/132 |
| 4,948,833 | 8/1990 | Araki et al. ............................ | 524/508 |
| 4,990,077 | 2/1991 | Morita ................................... | 425/556 |
| 5,075,810 | 12/1991 | Iwahashi ............................... | 360/132 |

*Primary Examiner*—Jefferson Evans
*Attorney, Agent, or Firm*—Hill, Steadman & Simpson

[57] ABSTRACT

A tape cassette having a tape guide for contacting with a magnetic tape provided as a tape coil within a main cassette body, and guiding the running of the magnetic tape, is disclosed. The tape guide for guiding the magnetic tape is molded with a lower cassette half integrally from an ultra high molecular resin having a molecular weight ranging from 500,000 to 1,000,000 for simplifying the assembling process and reducing production costs as well as preventing adverse effects of deviation from true verticality of the tape guide on the magnetic tape during recording/reproduction or fast feed/rewind to assure stable tape running.

4 Claims, 2 Drawing Sheets

TAPE CASSETTE

BACKGROUND OF THE INVENTION

1. Field of the Invention

This invention relates to a tape cassette provided with a tape guide adapted for contacting with a magnetic tape wound as a tape coil in a main cassette body for guiding the travel of the magnetic tape.

2. Description of the Prior Art

In FIG. 1, there is shown a tape cassette heretofore employed as a recording medium for a video tape recorder. The tape cassette is comprised of a cassette proper 50, made up of an upper cassette half 51 and a lower cassette half 52, produced by molding synthetic resin; a pair of tape reels 53, 53, similarly prepared by molding synthetic resin; and a magnetic tape 54 wound about the tape reels 53, 53. The upper and lower cassette halves 51 and 52 are abutted and secured to each other by plural set screws, not shown, to form the cassette proper, and the tape reels 53, 53 are rotatably supported within the thus formed cassette proper.

A portion of the magnetic tape 54 travels outside of the cassette proper 50. This portion of the tape 54 travels through openings 55 and 56 formed on the front side of the cassette 50.

A front cover 57 is provided on the cassette. During non-use of the tape cassette, the front cover overlies the magnetic tape 54 on the exterior of the cassette 50 to protect the magnetic tape 54 against possible injuries.

As shown in FIG. 2, the lower half 52 is provided with tape guides 58 and 59 made of a metallic material.

The function of the tape guides 58 and 59 is to guide the magnetic tape 54 being drawn out, and to contact with the reverse side of the magnetic tape 54. The guides 58 and 59 also act to guide the winding of the magnetic tape 54 on the tape reels 53, 53 to ensure smooth tape travel when the tape cassette is mounted in position on a recording and/or reproducing apparatus and the magnetic tape 54 is run for recording/reproduction of fast feed/rewind.

Hence, in view of the frictional and wearing characteristics needed to perform the above-described functions, the tape guides 58 and 59 are formed of a material distinct from the material of the cassette proper 50.

More specifically, the substantially cylindrical tape guide 58, has an inner diameter approximately equal to the outer diameter of a guide core 58a cast integrally with the lower half 52. The tape guide 58 is formed of a material resistant against friction or abrasion, such as metal, and force fitted into the guide core 58a, as shown in FIG. 4, so that the tape guide 58 is perpendicular to the lower half 52. The tape guide 59 is mounted similarly to the tape guide 58.

A typical example of the tape guide, shown in Japanese Patent KOKAI Publication No. 61-110388, is molded from a synthetic resin having surface electrical resistivity of $10^3$ to $10^9$ ohm and containing lubricants, carbon fibers and carbon black to provide for smooth tape running.

One of the factors important in assuring smooth tape running is perpendicularity of the tape guides 58 and 59 with respect to the lower cassette half 52. The tape guides are not perpendicular to the cassette half, stable running of the magnetic tape 54 is hindered, thus degrading the quality of recording/reproduction or fast feed/rewind operations.

With the above described tape cassette, the tape guides 58 and 59 are cast from metal so as to be rendered resistant against wear or friction. Fabricating these guides from metal not only raises production costs, but requires a complicated surface treatment process (for example, heat treatment) to improve the hardness and the surface performance of the tape guides. Also, since the lower half 52 and the tape guides 58, 59 are separately fabricated and subsequently assembled, the production process is also complicated, with relatively high production costs.

In addition, since the tape guides 58, 59 cast separately from the lower half 52 are force fitted into the lower half 52, it is relatively difficult to mount the tape guides 58 and 59 at right angles to the lower half 52 with high accuracy, thus giving rise to various ill effects on the tape running performance.

OBJECT AND SUMMARY OF THE INVENTION

It is an object of the present invention to provide a tape cassette which may be assembled by a simplified assembly process.

It is another object of the present invention to provide a tape cassette in which stable tape running may be assured.

It is a further object of the present invention to provide a tape cassette having excellent abrasion resistance.

It is yet another object of the present invention to provide a tape cassette in which the main cassette body and the tape guide provided within said main cassette body are formed from separate suitable synthetic resin materials.

The present invention provides a tape cassette in which a pair of tape reels are accommodated in a main cassette body formed by an upper cassette half and a lower cassette half abutted and connected to each other, and in which a magnetic tape is placed around the tape reels and adapted to be reeled out of the main cassette body by means of an aperture formed in the front said of the main cassette body.

In an embodiment of the invention, a tape guide provided within the main cassette body in the vicinity of the aperture for guiding said magnetic tape reeled out of the aperture is molded integrally with the lower cassette half from an ultra high molecular synthetic resin material having a molecular weight ranging from 500,000 to 1,000,000.

In another embodiment, a tape guide provided within the main cassette body in the vicinity of the aperture for guiding the magnetic tape being reeled out of the aperture is molded integrally from the lower cassette half by two-color molding.

DETAILED DESCRIPTION OF PREFERRED EMBODIMENT

Figure 1:
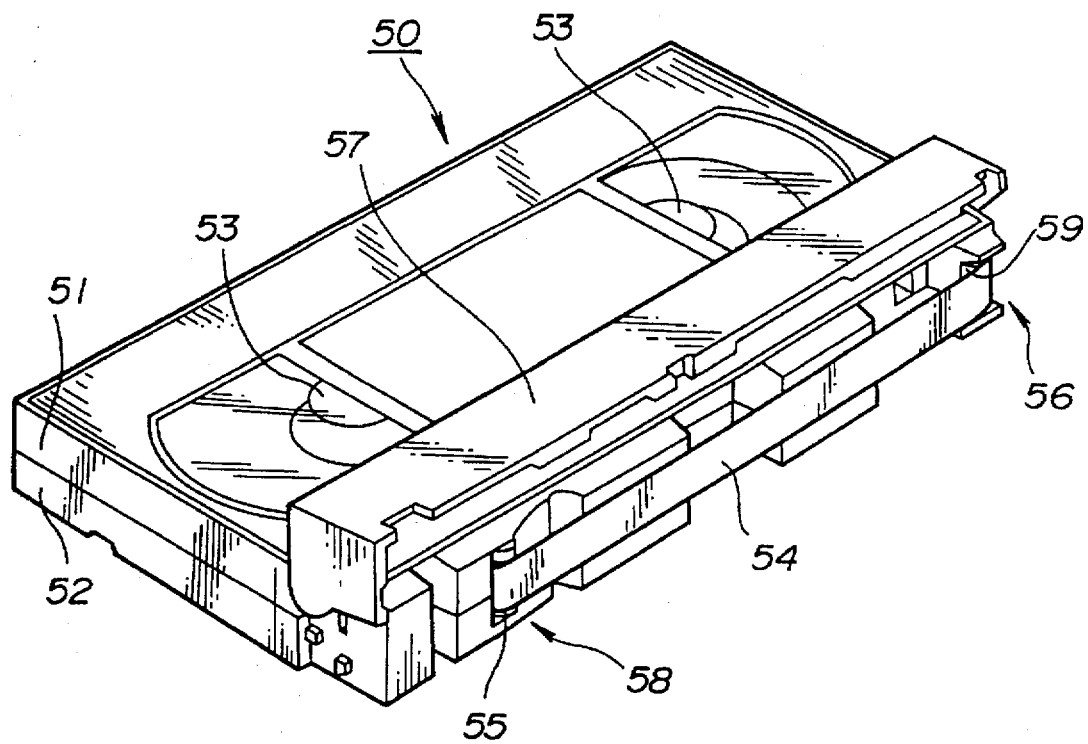
FIG. 1 is a perspective view showing a conventional tape cassette.

By referring to the drawings, certain preferred embodiments of the present invention will be explained in detail.

Since the construction of the tape cassette according to the present invention is similar to the above described construction of the conventional cassette, the detailed description therefor is omitted for simplicity.

Figure 5:
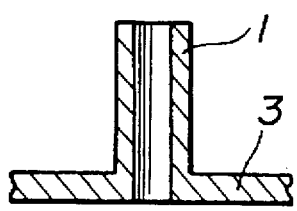
FIG. 5 is a cross-sectional view showing an essential part of a tape guide of the tape cassette according to the present invention.
Figure 6:
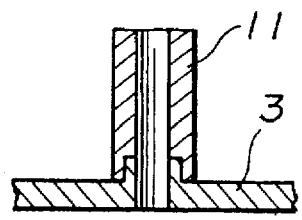
FIG. 6 is a cross-sectional view showing a tape guide for a tape cassette according to a modification of the present invention.

Referring to FIG. 5, showing a preferred embodiment of the present invention, a tape guide 1 adapted for guiding a magnetic tape and a lower cassette half 3 are molded integrally from an ultra high molecular synthetic resin material having a molecular weight in the range of 500,000 to 1,000,000.

Such ultra high molecular synthetic resin material may be obtained by mixing, for example, polyphenylene sulfide (PPS) and polybutylene terephthalate (PBT).

It is noted that, with molecular weight of the resin material less than 500,000, surface properties of the molded tape guide are lowered, that is, the tape guide presents roughened surfaces, whereas, with the molecular weight higher than 1,000,000, the molded tape guide is lowered in hardness. It is therefore preferred to employ the ultra high molecular synthetic resin material having the molecular weight in the range from 500,000 to 1,000,000.

The above mentioned integral molding may be performed by injection molding with the use of the above specified ultra high molecular synthetic resin material.

For performing the injection molding, separate metallic molds having mold cavities shaped to suit the lower cassette half 3 and the tape guide 1 are provided in an injection molding machine and the ultra high molecular synthetic resin having the molecular weight in the range from 500,000 to 1,000,000 is injected from separate cylinders into the separate mold cavities.

In this manner, the lower half 3 and the tape guide 1 may be molded integrally.

Since the tape guide 1 thus prepared is in the form of a tube with the cross-sectional shape of an approximately true circle, the magnetic tape running in contact therewith is less apt to wear. In addition, since the ultra high molecular polyethylene, as the above mentioned ultra high molecular synthetic resin material, is superior in smoothness or lubriciousness, and is hardly subject to wear due to frictional contact with the reverse surface of the magnetic type, the tape guide properties may be maintained for a prolonged time interval to assure stable recording/reproduction and fast feed/rewind performance. Besides, since the injection molding enables accurate molding, the tape guide 1 may be mounted substantially perpendicularly with respect to the lower cassette half 3.

Meanwhile, when the lower half 3 and the tape guide 1, thus molded integrally, are taken out from the method mold, and allowed to be cooled and solidified, it may occur that the tape guide 1 becomes distorted or bent due to "sink". In order to combat such "sink", a metallic mold having the outer lateral surface extending at right angles to the lower cassette half 3 and the inner lateral surface tapered towards the upper end of the tape guide abutting on the upper cassette half may be used to permit the metallic mold to be taken out from the molded tape guide 1 without practically any hinderances.

The lower cassette half 3, thus molded integrally with the tape guide 1, may be formed into a complete tape cassette by having the lower cassette half combined with the upper cassette half after a tape reel having a coil of the magnetic tape thereon is disposed in position within the interior of the lower cassette half.

By molding the tape guide 1 and the lower cassette half 3 integrally from ultra high molecular polyethylene with the molecular weight of 500,000 to 1,000,000, it becomes unnecessary to mold separately and assemble the tape guide 1 and the lower cassette half 3, so that the production process may be simplified. In addition, the tape guide is highly resistant to wear caused by frictional contact with the magnetic tape and superior in lubriciousness. The tape guide is integrally molded perpendicular to the cassette half in order to prevent adverse effects on recording and/or reproduction otherwise caused by non-perpendicular guides.

Although the lower cassette half 3 and the tape guide 1 are molded integrally from ultra high molecular polyethylene with a molecular weight of 500,000 to 1,000,000, the tape guide 1 may also be molded integrally with the upper cassette half.

A modified embodiment of the present invention will hereinafter be explained.

Figure 2:
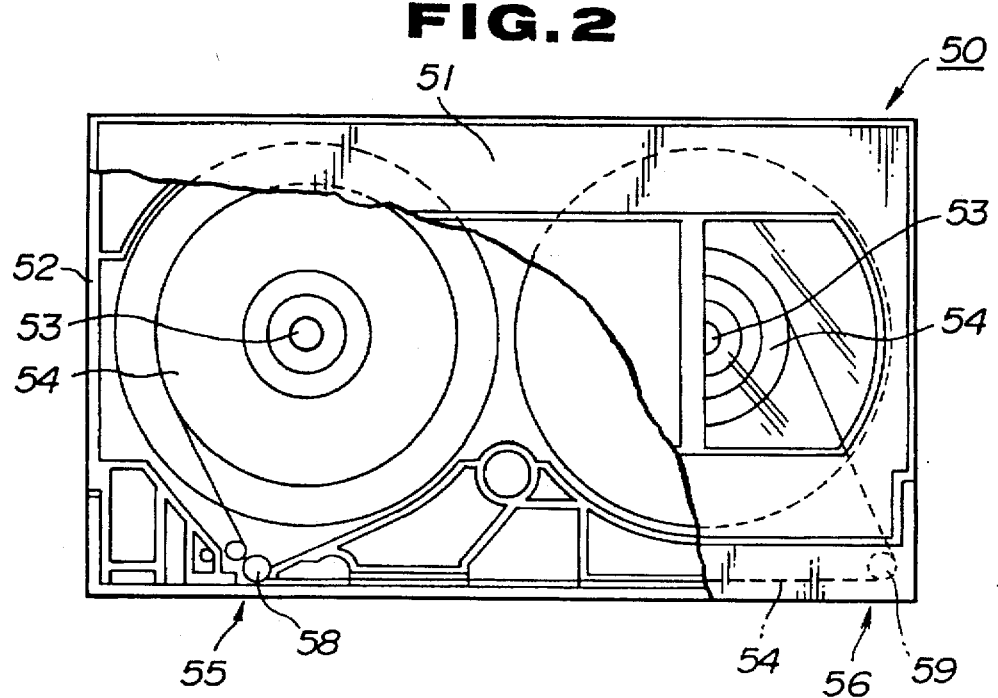
FIG. 2 is a plan view of the tape cassette shown in FIG. 1, with a portion thereof being cut-away.
Figure 3:
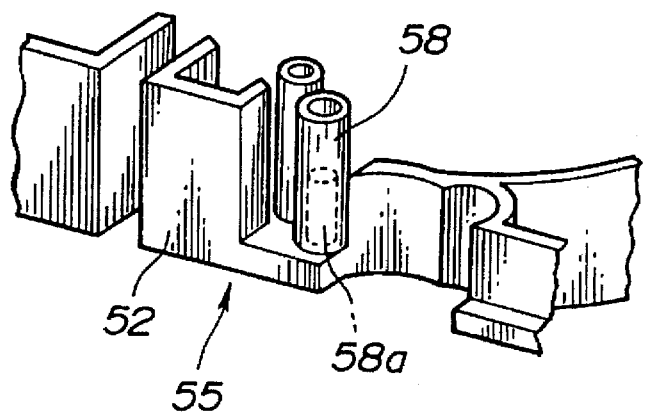
FIG. 3 is a perspective view showing a tape guide provided in the tape cassette shown in FIG. 1.
Figure 4:
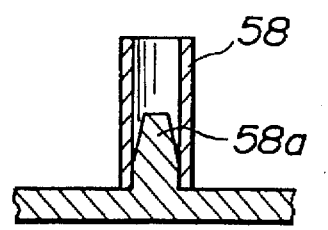
FIG. 4 is a side elevational view of the tape guide shown in FIG. 3.

In the preceding embodiment, the tape guide 1 and the lower cassette half 3 are molded integrally from ultra high molecular polyethylene having a molecular weight ranging from 500,000 to 1,000,000. In the modification shown in FIG. 2, only the tape guide 11 is molded from ultra high molecular polyethylene having a molecular weight from 500,000 to 1,000,000, and the lower cassette half 3 is molded by two-color molding from a separate molding material, such as ABS resin.

With the two-color molding, the lower cassette half 3 and the tape guide 11 are molded from separate molding materials by means of the same injection molding machine.

More specifically, the lower cassette half 3 is first molded from a molding material having a higher strength, such as ABS resin, by a first metallic mold, and the tape guide 11 is then formed from ultra high molecular polyethylene having the molecular weight ranging from 500,000 to 1,000,000 by a second metallic mold. In this manner, the lower cassette half 3 and the tape guide 11 may be melt-fused to each other to form a unitary component.

By molding only the tape guide 11 from ultra high molecular polyethylene having the molecular weight ranging from 500,000 to 1,000,000, and molding the lower cassette half 3 from a molding material different from the material of the tape guide 11, such as the ABS resin, by a two-color molding, the tape cassette may be prepared by using a material for the lower cassette half 3 suited as the lower cassette half material and another material for the tape guide 11 suited as the tape guide material.

By virtue of the two-color molding, the tape guide 11 may be provided with good verticality with respect to the lower cassette half 3 and molded from ultra high molecular polyethylene with the molecular weight ranging from 500,000 to 1,000,000, so that the tape cassette may be prepared at reduced costs and with high accuracy.

What is claimed is:

1. A tape cassette in which a pair of tape reels are accommodated in a main cassette body formed by an upper cassette half and a lower cassette half abutted and connected to each other, and in which a magnetic tape is placed around said tape reels and adapted to be reeled out of said main cassette body by means of an aperture formed in the front side of said main cassette body, comprising the improvement of:

a tape guide, provided within said main cassette body in the vicinity of said aperture for guiding said magnetic tape being reeled out of said aperture, is molded integrally with said lower cassette half, both said lower cassette half and said tape guide comprising an ultra high molecular synthetic resin material having a molecular weight ranging from 500,000 to 1,000,000.

2. The tape cassette according to claim 1 wherein said ultra high molecular synthetic resin material is ultra high molecular polyethylene.

3. The tape cassette according to claim 1 wherein said tape guide is cylindrical.

4. The tape cassette according to claim 3 wherein said tape guide is tapered.

* * * * *